US012560795B2

(12) United States Patent
Yang

(10) Patent No.: US 12,560,795 B2
(45) Date of Patent: Feb. 24, 2026

(54) MICROSCOPE SYSTEM AND CORRESPONDING CONTROL SYSTEM, METHOD AND COMPUTER PROGRAM

(71) Applicant: Leica Instruments (Singapore) Pte. Ltd., Singapore (SG)

(72) Inventor: Gao Yang, Singapore (SG)

(73) Assignee: Leica Instruments (Singapore) Pte. Ltd., Singapore (SG)

( * ) Notice: Subject to any disclaimer, the term of this patent is extended or adjusted under 35 U.S.C. 154(b) by 919 days.

(21) Appl. No.: 17/659,848

(22) Filed: Apr. 20, 2022

(65) Prior Publication Data

US 2022/0334370 A1     Oct. 20, 2022

(30) Foreign Application Priority Data

Apr. 20, 2021     (DE) ..................... 10 2021 109 988.9

(51) Int. Cl.
  G02B 21/36          (2006.01)
  G02B 21/26          (2006.01)
(52) U.S. Cl.
  CPC ........... G02B 21/365 (2013.01); G02B 21/26 (2013.01)
(58) Field of Classification Search
  USPC ........................................................ 359/397
  See application file for complete search history.

(56) References Cited

U.S. PATENT DOCUMENTS

| | | | |
|---|---|---|---|
| 5,875,258 A | 2/1999 | Ortyn et al. | |
| 6,384,898 B1 * | 5/2002 | Inoue ..................... | G03B 27/42 |
| | | | 355/53 |
| 6,542,293 B2 * | 4/2003 | Yahiro .................. | B01L 3/5085 |
| | | | 250/201.3 |
| 2004/0233407 A1 | 11/2004 | Nishi et al. | |
| 2012/0002034 A1 * | 1/2012 | Matsunobu ............ | G06V 20/69 |
| | | | 348/79 |
| 2020/0211233 A1 * | 7/2020 | Siegel ..................... | G06F 3/013 |

FOREIGN PATENT DOCUMENTS

| | | |
|---|---|---|
| EP | 0951054 A1 | 10/1999 |
| JP | 201863376 A | 4/2018 |

* cited by examiner

*Primary Examiner* — Derek S. Chapel
(74) *Attorney, Agent, or Firm* — SPL Patent Attorneys PartG mbB; Kieran O'Leary

(57)          ABSTRACT

A microscope system with a corresponding control system, method and computer program. The microscope system includes a microscope that generates images of a sample being arranged on a sample stage. The microscope system has a sample stage that carries the sample. The sample stage has a visual marker. The method uses an optical imaging sensor that provides image data of an image showing the visual marker of the sample stage. The method uses a control system that determines a position of the sample stage based on the image data of the image showing the visual marker.

14 Claims, 3 Drawing Sheets

MICROSCOPE SYSTEM AND CORRESPONDING CONTROL SYSTEM, METHOD AND COMPUTER PROGRAM

TECHNICAL FIELD

Examples relate to a microscope system and to a corresponding control system, method and computer program, and more specifically, but not exclusively, to a concept for determining a position of a movable sample stage of the microscope system.

BACKGROUND

Microscopes for industrial applications often have movable sample stages that can be moved along two axes (further denoted X- and Y-axis). To perform imaging across various positions of the sample stage, precise X-Y positioning of the stage may be required for object alignment and image stitching. In many cases, optical or magnetic linear encoders are used to determine the X-Y positions of the stage. Image stitching may use both the measured X-Y positions as well as image landmarks (of the sample) to align and collate the images.

However, linear encoders may have different thermal expansion coefficients than the sample stage, making the positional readout inaccurate. Furthermore, the stage may have to stop in order to capture an image at each desired X-Y position. Image stitching can be difficult or inaccurate when X-Y positions are inaccurate, and when the object has weak visual contrast or repetitive patterns.

There may be a desire for providing an improved concept for determining a position of a movable sample stage.

SUMMARY

This desire is addressed by the subject-matter of the independent claims.

Various examples of the present disclosure are based on the finding, that instead of using a linear encoder for determining the position of a movable sample stage, a visual approach may be chosen, with a visual marker that is displayed on top of or underneath the sample stage. As the visual marker is part of the sample stage, the rates of thermal expansion may be the same, or at least similar, for the sample stage and the visual marker. An optical imaging sensor is used to generate image data of an image showing the visual marker, and the image data is analyzed to determine the position of the sample stage.

Various examples of the present disclosure relate to a microscope system. The microscope system comprises a microscope configured to generate images of a sample being arranged on a sample stage. The microscope system comprises a sample stage configured to carry the sample. The sample stage comprises a visual marker. The microscope system comprises an optical imaging sensor configured to provide image data of an image showing the visual marker of the sample stage. The microscope system comprises a control system configured to determine a position of the sample stage based on the image data of the image showing the visual marker. As the visual marker is part of the sample stage, and therefore also follows the rate of thermal expansion of the sample stage, a higher accuracy may be reached.

In various examples, the sample stage is configured to move along two lateral dimensions. The control system may be configured to determine the position of the sample stage with respect to the two lateral dimensions. In other words, the X-Y-position of the sample stage may be determined.

For example, the sample stage may be a motorized sample stage. A motorized sample stage may be used for automatic recording of large samples across multiple positions of the sample stage.

In some examples, a throughput of the imaging of the microscope may be increased by continuously keeping the sample stage moving. For example, instead of stopping the sample stage for each image being taken, the sample stage may move continuously, and the proposed concept may be used to determine the position of the sample stage as the sample stage moves. For example, the motorized sample stage may be configured to continuously move while the microscope is generating a plurality of images at a plurality of points in time. The optical imaging sensor may be configured to generate the image data of the image showing the visual marker while the motorized sample stage is in motion. The control system may be configured to determine the position of the motorized sample stage at the plurality of points in time based on the image data of images showing the visual marker being generated while the motorized sample stage is in motion. This may increase the throughput of the microscope system.

To avoid or reduce motion artefacts in case the sample stage moves continuously, a strobe light may be used. The microscope system may comprise at least one illumination element for illuminating the visual marker and/or the sample with light strobes. The control system may be configured to trigger the illumination element to emit light strobes at the plurality of points in time. The light strobes may be brighter than environmental light, so that most of the light being recorded by an optical imaging sensor of the microscope and/or by the optical imaging sensor used for determining the position of the sample stage is caused by the light strobes.

For example, the control system may be configured to trigger the illumination element to emit the light strobes so that each pixel of an image being generated by the microscope and/or each pixel of a sample of the image data of the image showing the visual marker is exposed to a reflection of the same light strobe. For example, the light strobes may be timed so that, as the respective optical imaging sensor is read out line-by-line or block-by-block, all of the lines/blocks of the optical imaging sensor being used to generate an image frame have been exposed to light from the same strobe.

In some examples, the visual marker is arranged at a bottom side of the sample stage and the optical imaging sensor is arranged below the sample stage. This way, the visual marker might not be covered by a large sample, and the microscope can be handled without interfering with the optical imaging sensor, e.g., when the microscope is tilted. Alternatively, the visual marker is arranged at a top side of the sample stage and the optical imaging sensor is arranged above the sample stage. In this case, the same illumination element for emitting light strobes may be used for the sample and for the visual marker.

In some examples, the microscope system comprises two or more optical imaging sensors for providing image data of two or more images showing at least one of two or more visual markers of the sample stage. The control system may be configured to determine the position of the sample stage based on the image data of the two or more images showing the at least one of the two or more visual markers. By using multiple cameras and visual markers, smaller markers and a shorter distance between the optical imaging sensors and the visual markers may be used, while still allowing a large lateral movement.

For example, a lateral extent of the visual marker may be at least as large as a maximal lateral movement of the sample stage. In this case, the size of the visual marker may enable the determination of the position of the sample stage.

In some examples, the visual marker has a two-dimensional visual pattern. The two-dimensional pattern may be used to determine the position of the sample stage in two lateral dimensions.

Alternatively or additionally, the sample stage may comprise a first visual marker being aligned with a first lateral direction of movement and a second visual marker being aligned with a second lateral direction of movement of the sample stage. Each of the first and second marker may have a one-dimensional visual pattern. In this case, the first visual marker may be used to determine the position of the sample stage along the first lateral direction of movement, and the second visual marker may be used to determine the position of the sample stage along the second lateral direction of movement.

In various examples, the control system may be configured to determine the position of the sample stage relative to the microscope. This way, the position of the sample stage, and thus the position of the sample being recorded, may be recorded with the images taken by the microscope. For example, the control system may be configured to annotate the images taken by the microscope with the position of the sample stage at the time the images are generated.

Various examples of the present disclosure relate to a corresponding control system for the microscope system. The microscope system comprises a microscope configured to generate an image of a sample being arranged on a sample stage and a sample stage configured to carry the sample. The sample stage comprises a visual marker. The control system comprises one or more processors and one or more storage devices. The system is configured to obtain image data of an image showing the visual marker of the sample stage from an optical imaging sensor of the microscope system. The system is configured to determine a position of the sample stage based on the image data of the image showing the visual marker.

Various examples of the present disclosure relate to a corresponding method for the microscope system. The microscope system comprises a microscope configured to generate an image of a sample being arranged on a sample stage and a sample stage configured to carry the sample. The sample stage comprises a visual marker. The method comprises obtaining image data of an image showing the visual marker of the sample stage. The method comprises determining a position of the sample stage based on the image data of the image showing the visual marker.

Various examples of the present disclosure relate to a corresponding computer program with a program code for performing the above when the computer program is executed on a processor.

SHORT DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Figure 1A:
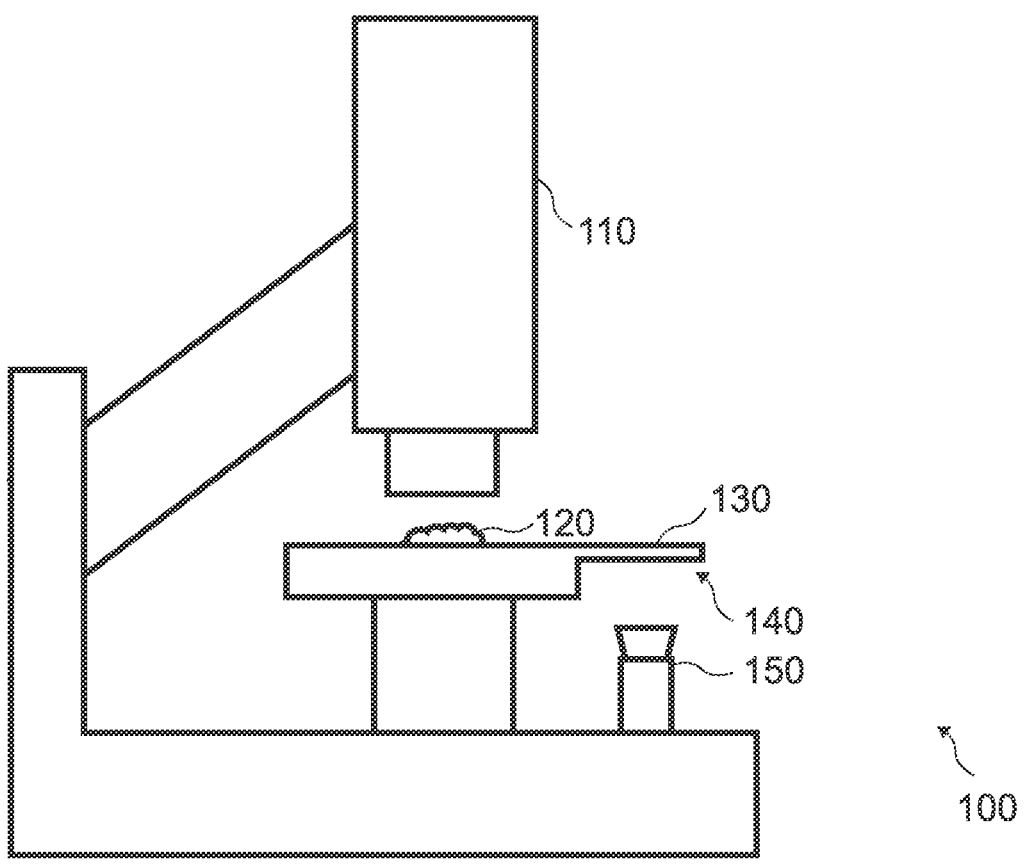
FIG. 1a shows a schematic diagram of an example of a microscope system.

FIG. 1a shows a schematic diagram of an example of a microscope system 100. The microscope system 100 comprises a microscope 110 configured to generate images of a sample 120 being arranged on a sample stage. In general, a microscope is an optical instrument that is suitable for examining objects that are too small to be examined by the human eye (alone). For example, a microscope may provide an optical magnification of a sample, such as the sample 120. In modern microscopes, the optical magnification is often provided for a camera or an imaging sensor, such as an optical imaging sensor of the microscope 110. The microscope 110 may further comprise one or more optical magnification components that are used to magnify a view on the sample, such as an objective (i.e., lens).

There are a variety of different types of microscopes. If the microscope is used in the medical or biological fields, the sample being viewed through the microscope may be a sample of organic tissue, e.g., arranged within a petri dish or present in a part of a body of a patient. For example, the microscope system 100 may be a microscope system for use in a laboratory, e.g., a microscope that may be used to examine the sample of organic tissue in a petri dish. Alternatively, the microscope system 100 may be a microscope system for use in material science and/or quality control. In particular, the microscope system 100 may be a microscope system for generating highly detailed images of a large sample by generating and stitching together a plurality of images. Although embodiments are described in connection with a microscope, they may also be applied, in a more general manner, to any optical device.

The microscope 110 of the microscope system 110 is used with a number of additional optional or mandatory components. Therefore, the term "microscope system" is used, in order to also cover the portions of the system that are not part of the actual microscope (which comprises optical components and is thus also denoted "optics carrier"), but which are used in conjunction with the microscope, such as a sample stage, an additional optical imaging sensor, and a control system, as will be shown in the following.

The microscope system further comprises a sample stage (e.g., an X-Y-stage) 130 configured to carry the sample. The sample stage comprises a visual marker 140 (that is arranged at a pattern area of the sample stage). The microscope system further comprises an optical imaging sensor (also denoted X-Y camera) 150 configured to provide image data of an image showing the visual marker of the sample stage.

Figure 1B:
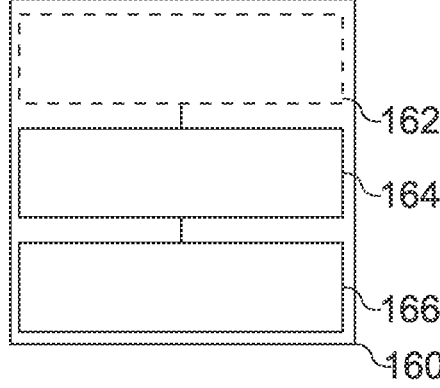
FIG. 1b shows a block diagram of an example of a control system for a microscope system.

The microscope system further comprises a control system configured to determine a position of the sample stage based on the image data of the image showing the visual marker. FIG. 1b shows a block diagram of an example of the control system 160 for a microscope system, e.g. for the microscope system of FIG. 1a. For example, as shown in FIG. 1b, the control system 160 comprises one or more processors 164 and one or more storage devices 166. Optionally, the control system comprises one or more interfaces 162. The one or more processors are coupled to the one or more storage devices and to the optional interface. In general, the functionality of the control system is provided by the one or more processors, e.g., in conjunction with the optional interface (for exchanging information) and/or the one or more storage devices (for storing data). The control system 160 is configured to obtain the image data of the image showing the visual marker of the sample stage from the optical imaging sensor 150 of the microscope system (e.g. via the interface 162). The control system is configured to determine the position of the sample stage based on the image data of the image showing the visual marker.

Figures 1C, 3, 4:
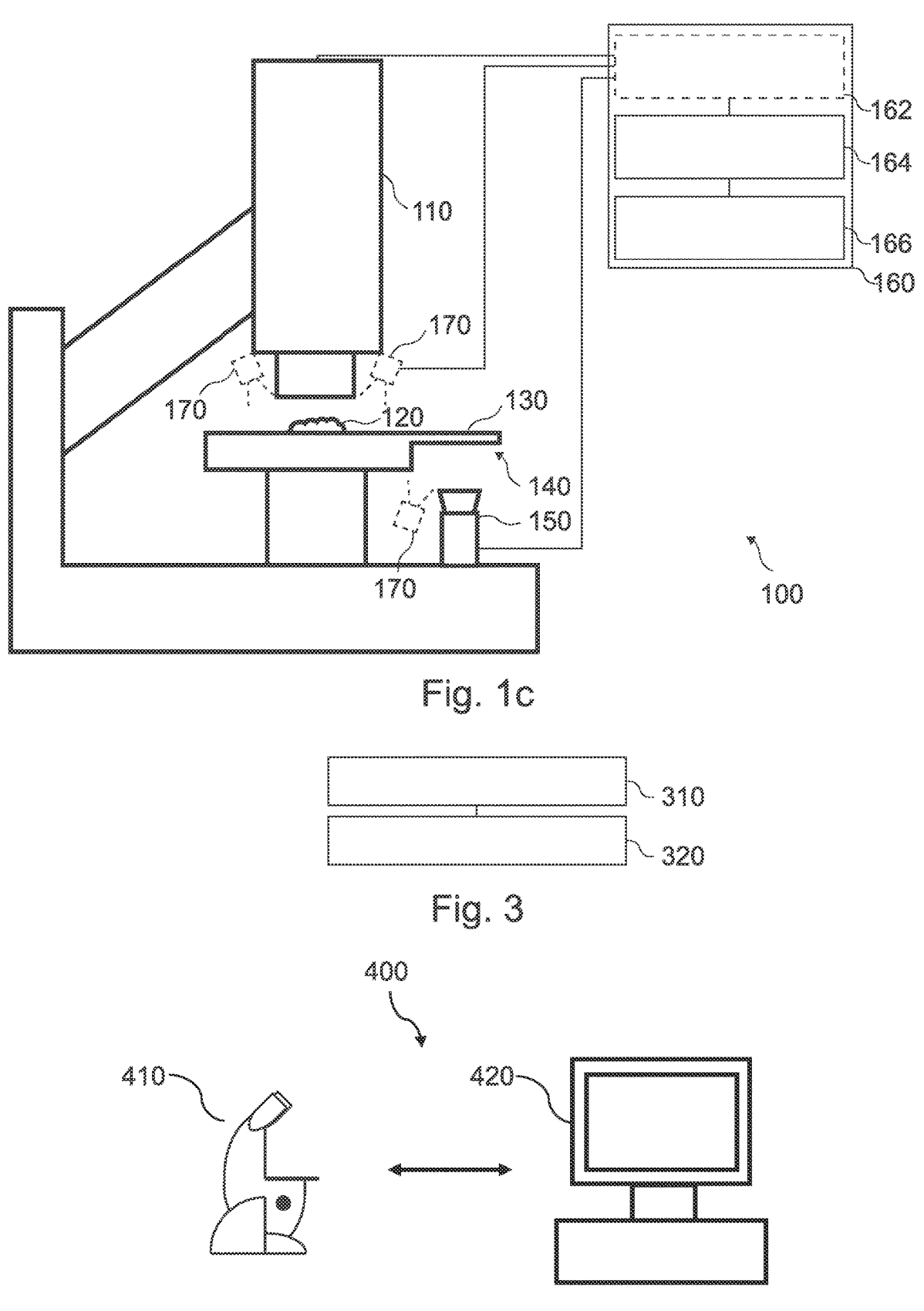
FIG. 1c shows a schematic diagram of an example of a microscope system comprising a control system.
FIG. 3 shows a flow chart of an example of a method for a microscope system.
FIG. 4 shows a schematic diagram of a system comprising a microscope and a computer system.

In FIG. 1c, a schematic diagram is shown of an example of the microscope system 100 comprising the control system 160. The microscope system 100 of FIG. 1c shows further optional components, such as at least one illumination element 170.

Various examples of the present disclosure provide a concept for detecting a position of a sample stage of a microscope, to support image stitching of images generated by the microscope. The proposed microscope system is equipped with the sample stage 130, of which the position is determined by the control system. Accordingly, the sample stage may move (and is thus movable) relative to the microscope 110. Furthermore, the sample stage may move relative to optical imaging sensor 150. In other words, the optical imaging sensor may remain at a fixed position, while the sample stage moves relative to the optical imaging sensor. In effect, the position of the microscope 110 and of the optical imaging sensor 150 may shift relative to the sample stage 130 if the sample stage is moved. In some examples, the sample stage may be moved by hand. Alternatively, the sample stage may be a motorized sample stage. In other words, the sample stage may comprise a motor for moving the sample stage.

For example, the sample stage may be configured to move relative to the microscope according to a pre-defined pattern, e.g., according to a z-shaped pattern or according to a serpentine pattern.

In various examples, the sample stage may be moved along one or two lateral dimensions relative to the microscope 110. In particular, in some examples, the sample stage may be configured to move along two lateral dimensions (with one of the lateral dimensions being perpendicular to the other lateral dimension). Therefore, the sample stage may also be denoted a X-Y-stage, as it may be moved along the X- and Y-lateral dimensions. In some examples, the sample stage may be further movable along a third dimension (i.e. the vertical dimension or Z-dimension). In this context, a lateral (i.e. horizontal) dimension is defined perpendicular to a direction of the force of gravity, and a vertical dimension is defined in parallel to the force of gravity.

The sample stage comprises the visual marker 140, which is used to determine the position of the sample stage. For example, the visual marker may be printed on the sample stage, or the visual marker may be etched into the sample stage, e.g., using a laser-based etching method. Alternatively, the visual marker may be inherent to the material of the sample stage, e.g., a result of a cast or tool being used to manufacture the sample stage. Alternatively, the visual marker may be attached to the sample stage using an adhesive or using another mechanical means for fastening the visual marker to the sample stage, e.g. using screws or rivets. In various examples, the visual marker may be designed such, that specular reflections are reduced or minimized.

In some examples, as shown in FIGS. 1a and 1c, the visual marker 140 is arranged at (e.g. printed onto, etched into or attached to) a bottom side of the sample stage and the optical imaging sensor is arranged (vertically) below the sample stage. Alternatively, the visual marker may be arranged at (e.g. printed onto, etched into or attached to) a top side of the sample stage and the optical imaging sensor may be arranged above the sample stage (not shown). In this context, the term "top side" of the sample stage may be a side of the sample stage that faces away from the center of gravity of the earth, while the "bottom side" of the sample stage may be a side of the sample stage that faces towards the center of gravity of the earth. Similarly, the optical imaging sensor being arranged above the sample stage means that the optical imaging sensor is located further away from the center of gravity of the earth than the sample stage, or at least further away than a surface of the sample stage comprising the visual marker. Accordingly, the optical imaging sensor being arranged below the sample stage means that the optical imaging sensor is located closer to the center of gravity of the earth than the sample stage, or at least closer than a surface of the sample stage comprising the visual marker. These definitions assume that the microscope system is oriented in manner that allows operation of the microscope with a sample being placed on the sample stage.

The position of the sample stage is determined by generating and analyzing image data of the visual marker of the sample stage. As the sample stage moves, the visual marker moves with the sample stage. Correspondingly, a portion of the visual marker that is visible in the image showing the visual marker also changes as the sample stage moves, as the sample stage also moves relative to the optical imaging sensor. As the sample stage moves along the one or two lateral dimensions, the visual marker moves as well, and the movement of the visual marker is shown in the image showing the visual marker.

This has an effect on the extent of the visual marker—to determine the position of the sample stage across the entire range of movement of the sample stage, a portion of the visual marker may be shown in the image of the image data generated by the optical imaging sensor at any (lateral) position of the sample stage. Consequently, a lateral extent (e.g. a maximal lateral distance along the one or two lateral dimensions between two outermost portions of the visual marker) of the visual marker may be at least as large as a maximal lateral movement of the sample stage. In other words, the visual marker may be large enough, so that, at any lateral position of the sample stage, a portion of the visual marker may be shown in the image of the image data generated by the optical imaging sensor. In some examples, this may be achieved by using a single contiguous visual marker. Alternatively, the sample stage may comprise two or more visual markers, which may be recorded by two or more optical imaging sensors. In other words, the microscope system may comprise two or more optical imaging sensors for providing image data of two or more images showing at least one of the two or more visual markers of the sample stage. Alternatively, a single optical imaging sensor may be used to provide image data of an image showing two or more visual markers of the sample stage, or two or more optical imaging sensors may be used to provide image data of an image showing a single contiguous visual marker.

In general, the visual marker may use any visual pattern that provides sufficient contrast for the subsequent analysis. For example, the visual marker may comprise a (pseudo-) random pattern, e.g. a random pattern that is based on dots, rectangles, triangles, polygons etc. Alternatively, the visual marker may be the inherent texture of the material surface. In some examples, a two-dimensional visual pattern may be used, so the movement along two lateral dimensions can be reliably tracked. In other words, the visual marker may have a two-dimensional visual pattern. Alternatively, two visual markers each having a one-dimensional visual pattern, such as a barcode, may be used. In other words, the sample stage may comprise a first visual marker being aligned with a first lateral direction of movement and a second visual marker being aligned with a second lateral direction of movement of the sample stage, with each of the first and second marker having a one-dimensional (or even two-dimensional) visual pattern. Specular reflection due to the pattern may be reduced or minimized so that a motion of the sample stage, and thus the visual marker, can be visually tracked.

In the proposed concept, the optical imaging sensor 150 is employed by the control system to generate image data of the visual marker, which the control system in turn evaluates to determine the position of the sample stage. Accordingly, the optical imaging sensor 150 is configured to generate the image data. For example, the optical imaging sensor 150 and/or the optical imaging sensor of the microscope 110 may comprise or be an APS (Active Pixel Sensor)—or a CCD (Charge-Coupled-Device)-based imaging sensor. For example, in APS-based imaging sensors, light is recorded at each pixel using a photo-detector and an active amplifier of the pixel. APS-based imaging sensors are often based on CMOS (Complementary Metal-Oxide-Semiconductor) or S-CMOS (Scientific CMOS) technology. In CCD-based imaging sensors, incoming photons are converted into electron charges at a semiconductor-oxide interface, which are subsequently moved between capacitive bins in the imaging sensors by a control circuitry of the imaging sensors to perform the imaging. The system 160 is configured to obtain (i.e., receive or read out) the image data from the optical imaging sensor. Optionally, the system 160 may be configured to obtain further image data from the optical imaging sensor of the microscope 110. The image data may be obtained by receiving the image data from the respective optical imaging sensor (e.g., via the interface 162), by reading the image data out from a memory of the respective optical imaging sensor (e.g., via the interface 162), or by reading the image data from a storage device 166 of the control system 160, e.g., after the image data has been written to the storage device 166 by the respective optical imaging sensor or by another system or processor.

The image data of the optical imaging sensor 150 comprises an image showing the visual marker of the sample stage. Accordingly, the optical imaging sensor 150 may be directed towards the visual marker of the sample stage, i.e. towards the sample stage. As the visual marker is moved above or underneath the optical imaging sensor (together with the sample stage), the movement of the visual marker is represented by the image data. In other words, at a given time, the image data comprises an image showing the visual marker, e.g., a portion of the visual marker, according to a current position of the sample stage. For example, at each position the sample stage, a unique portion of the visual marker may be shown by the image included in the image data.

In various examples, the position of the sample stage may be tracked over a plurality of points in time. For example, the sample stage may be moved continuously, with an image of the sample being generated by the microscope (or rather an optical imaging sensor of the microscope) at the plurality of points in time. In other words, the images of the sample and of the visual marker may be taken while the sample stage is moving. Correspondingly, the image data may comprise a plurality of images showing the visual marker (or rather a plurality of portions of the visual marker) representing the position of the sample stage at the plurality of points in time. For example, the sample stage may move continuously, with exceptions being made for changes in direction of the movement. However, even with such discontinuities in the movement, the movement of the sample stage may be considered to be continuous.

The control system is subsequently used to analyze the image data and determine the position of the sample stage. In general, the position of the sample may be defined with respect to the one or two lateral dimensions. In other words, the control system may be configured to determine the position of the sample stage with respect to the one or two lateral dimensions. For example, the control system may be configured to determine the position of the sample stage with respect to a one- or two-dimensional coordinate system representing the one or two lateral dimensions. For example, for each of the one or two dimensions, the position of the sample stage may be determined by the control system.

In some examples, the position of the sample stage may be determined relative to the microscope. In other words, the control system is configured to determine the position of the sample stage relative to the microscope. For example, the microscope may have a fixed position within the one- or two-dimensional coordinate system, and thus the position of the sample stage with respect to the one- or two-dimensional coordinate system may also be defined relative to the microscope.

In general, the pattern shown in the image showing the visual marker may be analyzed to determine the position of the sample stage. For example, at each position the sample stage, the image may show a portion of the visual marker, with each portion having a unique pattern. For example, the control system may be configured to compare the portion of the visual marker shown in the image to the (entire) pattern of the visual marker, to determine the position of the portion within the visual marker, and to determine the position of the sample stage based on the position of the portion within the visual marker. Alternatively or additionally, the position of the sample stage may be encoded within the pattern of the visual marker. For example, the visual marker may comprise a plurality of position indicators that are encoded within the pattern of the visual marker, with the plurality of position indicators being embedded at a plurality of pre-defined positions of the visual marker. For example, the control system may be configured to decode one or more position indicators shown in the image to determine the position of the sample stage based on the decoded position indicators. For example, if one or more position indicators are shown in the image, the position of the one or more position indicators within the image may be used to determine the position of the sample stage.

As mentioned above, in some cases, two or more optical imaging sensors may be used in combination with two or more visual markers that are arranged at different positions of the sample stage. In this case, the same approach may be used, depending on which of the two or more visual markers is visible at a given time. For example, the control system may be configured to determine the position of the sample stage based on the image data of the two or more images showing the at least one of the two or more visual markers. At any given time, at least one of the two or more visual markers may be shown in at least one of the two or more images. Therefore, the control system may be configured to determine the position of the sample stage based on the at least one of the two or more visual markers that is shown in at least one of the two or more images.

In general, the microscope system that is introduced in connection with FIGS. 1a to 1c may be used as a microscope for generating a (highly-detailed) composite image of the sample by subsequently generating a plurality of (partially overlapping) images of the sample using the optical imaging sensor of the microscope, and stitching together the plurality of images to generate the composite image. By synchronizing the X-Y camera (i.e. the optical imaging sensor 150), the microscope's main camera (i.e. the optical imaging sensor of the microscope), and their respective (strobing) light sources, it is possible to capture photos with accurate XY positional information while the stage is moving. The sample stage may be used to move the sample relative to the microscope as the images are taken. In other systems, this process may take a long time, as the sample stage moves in-between positions, stops, an image is taken, a position at which the image is taken is determined, and then the next position is taken. In various examples of the present disclosure, this process may be sped up using the proposed concept.

For example, the movement of the sample stage may be continuous, instead of stopping the sample stage for every image taken by the optical imaging sensor of the microscope. In other words, the motorized sample stage may be configured to continuously move while the microscope is generating a plurality of images at a plurality of points in time, e.g., without stopping the sample stage for the purpose of exposing the optical imaging sensor of the microscope while the sample is in a fixed position relative to the microscope. Accordingly, the optical imaging sensor 150 may be configured to generate the image data of the image showing the visual marker while the motorized sample stage is in motion. In other words, while the sample stage is in motion, an image, or rather a plurality of images to be stitched together to form the composite image of the sample, may be generated by the optical imaging sensor of the microscope at the plurality of points in time, and corresponding images may be generated, at the plurality of points in time, by the optical imaging sensor that is used to determine the position of the sample stage. The control system may be configured to determine the position of the motorized sample stage at the plurality of points in time based on the image data of images showing the visual marker being generated while the motorized sample stage is in motion. For example, at each of the plurality of points in time, an image may be generated by the optical imaging sensor of the microscope and by the optical imaging sensor being used to determine the position of the sample stage. The position of the sample stage at the plurality of points in time may be determined based on the images taken by the optical imaging sensor 150 at the plurality of points in time.

If the sample stage moves while the optical imaging sensor of the microscope and the optical imaging sensor used for determining the position of the sample stage is being exposed to light being reflected off the sample and of the visual marker, respectively, motion artefacts may be observed in the respective images. Furthermore, optical imaging sensors often apply a so-called "rolling shutter". In general, optical imaging sensors may comprise a two-dimensional grid of pixels, comprising a plurality of lines of pixels and a plurality of columns of pixels. The content of the two-dimensional grid of pixels is read out to generate a frame of image data. In many cases, only a subset of pixels of the two-dimensional grid of pixels is read out at once, e.g. line-by-line or block-by-block. To ensure that all of the pixels are exposed to the same (or at least similar) amounts of light, the duration of exposure to light of the pixels may be (substantially) the same for all of the pixels. As some pixels are read out earlier than others, these pixels are also exposed to the light earlier, to maintain the same exposure duration. The later a pixel is read out, the later the exposure of the pixel begins. The concept is shown in connection with FIG. 2.

Figure 2:
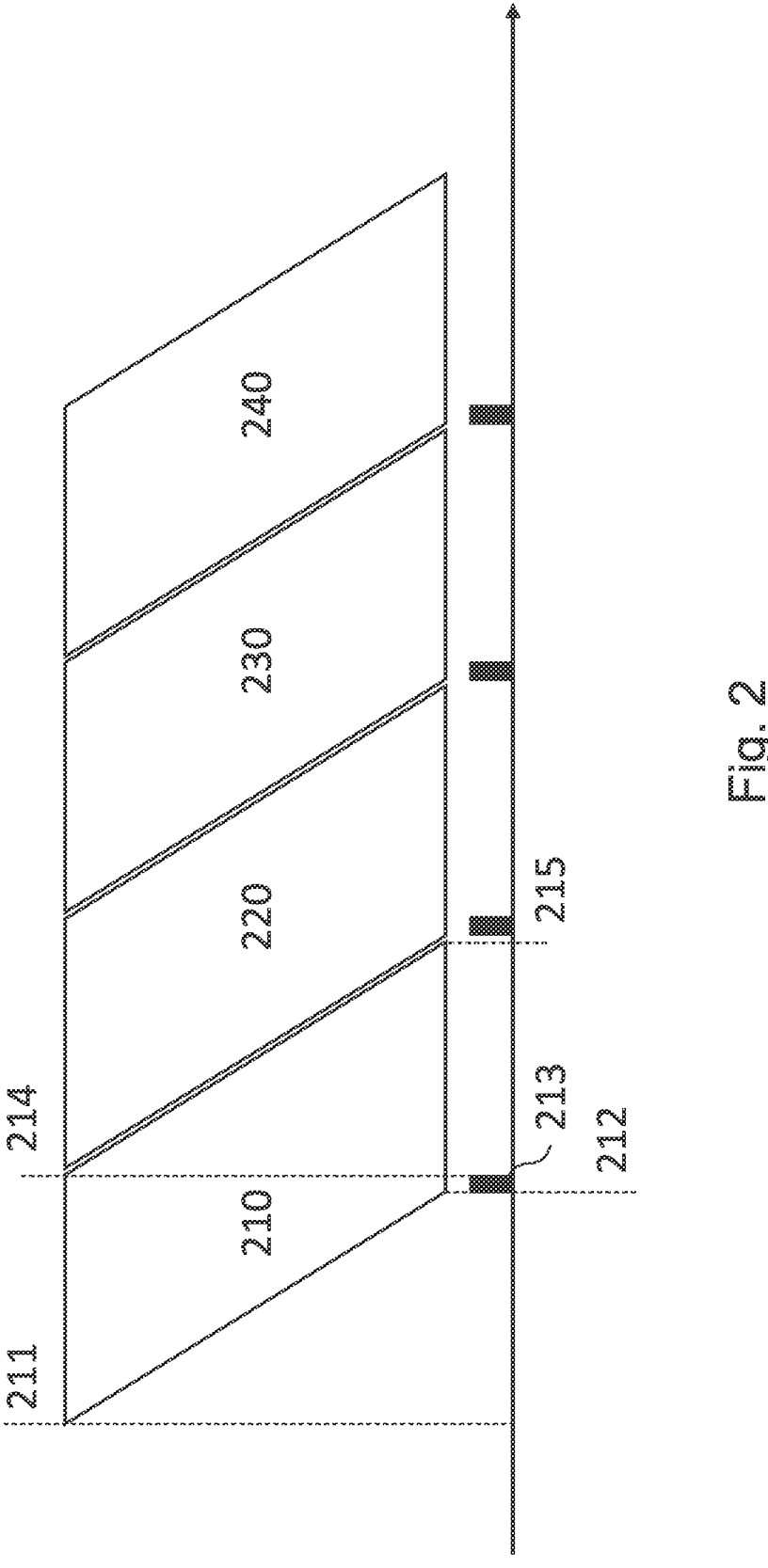
FIG. 2 shows an example of a timing diagram of a strobe-light relative to a read-out of an optical imaging sensor.

FIG. 2 shows an example of a timing diagram of a strobe-light relative to a read-out of an optical imaging sensor. For example, a strobe-light timing is synchronized to an optical imaging sensor exposure timing. In FIG. 2, the x-axis shows the time. Four frames are shown, a first frame 210, a second frame 220, a third frame 230 and a fourth frame 240. As can be seen in FIG. 2, the exposure of the lines of pixels to light, and subsequent read-out of the lines of pixels are time-shifted. FIG. 2a shows a line 211 indicating the beginning of exposure of the first line, and a further line 212 indicating the beginning of exposure of the last line of the first frame 210. FIG. 2a further shows a line 214 indicating the end of exposure of the first line and a line 215 indicating the end of exposure of the last line. As can be seen in FIG. 2a, the end of exposure of the last line of the first frame 210 may overlap with the beginning of exposure of the first line (or rather most lines) of the second frame 220. However, there is a time interval (between the beginning 212 of exposure of the last line and the end 214 of exposure of the first line), where all of the pixels of the optical imaging sensor are exposed to the same light.

A strobe light 213 may be used at this moment to illuminate the sample (and/or the visual marker), so that the light being recorded by the optical imaging sensor is predominately based on the reflections of the strobe light, thus drowning out the light recorded apart from the reflections of the strobe. In other words, to reduce or minimize rolling shutter distortions, and for consistent illumination of the visual pattern, the optical imaging sensor being used to determine the position of the sample stage and/or the optical imaging sensor of the microscope may have a synchronized strobing light 170 mounted next to or around its lens (as shown in FIG. 1c). The microscope's main optical imaging sensor and light source may also be synchronized with the optical imaging sensor and light source being used to determine the position of the sample stage to allow continuous capturing while the XY stage is in motion. In other words, the microscope system may comprise at least one illumination element 170 for illuminating the visual marker and/or the sample with light strobes. The control system may be configured to trigger the illumination element to emit light strobes at the plurality of points in time, e.g. before a first line of the grid of pixels has stopped exposing and after a last line of the grid of pixels has started exposing during the generation of the frame. The control system may be configured to trigger the illumination element to emit the light strobes so that each pixel of an image being generated by the microscope and/or each pixel of a sample of the image data of the image showing the visual marker is exposed to a reflection of the same light strobe, e.g. before a first line of the grid of pixels has stopped exposing and after a last line of the grid of pixels has started exposing during the generation of the frame if the sensor is exposed read out line-by-line. Thus, the light/illumination element may emit a short but strong burst of light after the respective optical imaging sensor's last line has started exposing but before the first line has stopped exposing. In effect, in cases where an image sensor with electronic rolling shutter is used, a strobing light source can be used to eliminate image skew when the stage is moving.

The positional resolution of the resulting images is determined by the combination of magnification and signal to noise ratio (SNR). For example, supposing the SNR is high enough for accurate quarter-pixel precision motion estimation, with the image sensor having a pixel pitch of 1.55 μm, and the X-Y precision required being 0.4 μm. A lens with $1.55/0.4/4=0.96875\times$ magnification or higher may be enough. The maximal speed of the stage may be capped by the field of view and frame rate of this camera, so that it can have enough overlapping image content between adjacent frames to calculate motion.

In general, the position of the sample stage is used for stitching the images generated by the optical imaging sensor of the microscope together to generate the composite image. For example, information on the position of the sample stage, e.g. at the plurality of points in time, may be stored in a storage device 166 of the control system, or be provided to an external entity. Alternatively or additionally, the information on the position of the sample stage may be stored with the images generated by the optical imaging sensor for the microscope. For example, the control system may be configured to annotate the images taken by the microscope with the position of the sample stage at the time the images are generated. In other words, the control system may be configured to obtain further image data comprising the images taken by the optical imaging sensor of the microscope from the optical imaging sensor of the microscope system, and to annotate the images taken by the optical imaging sensor with the information on the position, e.g. by generating, for each image taken, a corresponding data unit, e.g., a file, representing the position of the sample stage, and storing or outputting the data representing the position together with the file of the image taken. Alternatively, the information on the position may be included in metadata of the respective image taken by the optical imaging sensor of the microscope.

Various examples of the present concept thus provide a concept for determining a position of a sample stage. For example, at either the top or bottom side of the sample stage, which may be an X-Y stage that can move along two lateral dimensions, X and Y, a patch of patterns (i.e. a visual marker) may be placed. The patch of patterns may preferably exhibit similar properties with respect to thermal expansion as the sample stage itself. Furthermore, the dimensions of the visual marker may be at least as large as the range of X-Y movements of the stage. Alternatively, multiple patches of pattern coupled with the same number of cameras can be distributed across different areas of the stage to reduce the stage size. The pattern can be random dots or even the inherent texture of the material surface. Specular reflection may be reduced so that motion can be visually tracked. A digital camera, e.g., the optical imaging sensor being used for determining the position of the sample stage, is aimed at the pattern and used to determine the position of the sample stage. The digital camera sends image data (e.g., a video) to a processor to analyze and track the movement of the stage. Because the pattern is on the stage itself, its movement accurately represents the movement of the sample stage and hence the (X-Y) position of the sample stage.

The one or more interfaces 112 may correspond to one or more inputs and/or outputs for receiving and/or transmitting information, which may be in digital (bit) values according to a specified code, within a module, between modules or between modules of different entities. For example, the one or more interfaces 112 may comprise interface circuitry configured to receive and/or transmit information. In embodiments the one or more processors 114 may be implemented using one or more processing units, one or more processing devices, any means for processing, such as a processor, a computer or a programmable hardware component being operable with accordingly adapted software. In other words, the described function of the one or more processors 114 may as well be implemented in software, which is then executed on one or more programmable hardware components. Such hardware components may comprise a general-purpose processor, a Digital Signal Processor (DSP), a micro-controller, etc. In at least some embodiments, the one or more storage devices 116 may comprise at least one element of the group of a computer readable storage medium, such as a magnetic or optical storage medium, e.g., a hard disk drive, a flash memory, a Solid-State Drive (SSD), Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

More details and aspects of the microscope system and control system are mentioned in connection with the proposed concept or one or more examples described above or below (e.g. FIG. 3). The microscope system and/or the control system may comprise one or more additional optional features corresponding to one or more aspects of the proposed concept or one or more examples described above or below.

FIG. 3 shows a flow chart of an example of a corresponding method for a microscope system, e.g. the microscope system 100 of FIGS. 1a to 1c. As illustrated in connection with FIGS. 1a to 1c, the microscope system comprises a microscope 110 configured to generate an image of a sample 120 being arranged on a sample stage and a sample stage 130 configured to carry the sample 120, the sample stage comprising a visual marker 140. The method comprises obtaining 310 image data of an image showing the visual marker of the sample stage. The method comprises determining 320 a position of the sample stage based on the image data of the image showing the visual marker.

As indicated above, features described in connection with the microscope system 100, the control system 160, the sample stage 130, the microscope 110 and the at least one illumination element 170 of FIGS. 1a to 1c may be likewise applied to the method of FIG. 3.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some embodiments relate to a microscope comprising a system as described in connection with one or more of the FIGS. 1a to 3. Alternatively, a microscope may be part of or connected to a system as described in connection with one or more of the FIGS. 1a to 3. FIG. 4 shows a schematic illustration of a system 400 configured to perform a method described herein. The system 400 comprises a microscope 410 and a computer system 420. The microscope 410 is configured to take images and is connected to the computer system 420. The computer system 420 is configured to execute at least a part of a method described herein. The computer system 420 may be configured to execute a machine learning algorithm. The computer system 420 and microscope 410 may be separate entities but can also be integrated together in one common housing. The computer system 420 may be part of a central processing system of the microscope 410 and/or the computer system 420 may be part of a subcomponent of the microscope 410, such as a sensor, an actor, a camera or an illumination unit, etc. of the microscope 410.

The computer system 420 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 420 may comprise any circuit or combination of circuits. In one embodiment, the computer system 420 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 420 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 420 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 420 may also include a display device, one or more speakers, and a keyboard and/or controller, which can include a mouse, trackball, touch screen, voice-recognition device, or any other device that permits a system user to input information into and receive information from the computer system 420.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a Hard-Disk Drive (HDD), a Solid-State Drive (SSD), a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

LIST OF REFERENCE SIGNS

100 Microscope system
110 Microscope
120 Sample

15

130 Sample stage
140 Visual marker
150 Optical imaging sensor
160 Control system
162 Interface
164 Processor
166 Storage device
170 Illumination element
210 First frame
211 First line exposure begin
212 Last line exposure begin
213 Strobe
214 First line exposure end
215 Last line exposure end
220 Second frame
230 Third frame
240 Fourth frame
310 Obtaining image data
320 Determining a position of a sample stage
400 System
410 Microscope
420 Computer system

The invention claimed is:

1. A microscope system comprising:
a microscope configured to generate images of a sample being arranged on a sample stage;
a sample stage configured to carry the sample, the sample stage comprising a visual marker, wherein the visual marker is arranged at a bottom side of the sample stage and wherein a lateral extent of the visual marker is at least as large as a maximal lateral movement of the sample stage;
an optical imaging sensor configured to provide image data of an image showing the visual marker of the sample stage, wherein the optical imaging sensor is arranged below the sample stage; and
a control system configured to determine a position of the sample stage based on the image data of the image showing the visual marker.

2. The microscope system according to claim 1, wherein the sample stage is configured to move along two lateral dimensions, wherein the control system is configured to determine the position of the sample stage with respect to the two lateral dimensions.

3. The microscope system according to claim 1, wherein the sample stage is a motorized sample stage.

4. The microscope system according to claim 3, wherein the motorized sample stage is configured to continuously move while the microscope is generating a plurality of images at a plurality of points in time, the optical imaging sensor being configured to generate the image data of the image showing the visual marker while the motorized sample stage is in motion, wherein the control system is configured to determine the position of the motorized sample stage at the plurality of points in time based on the image data of images showing the visual marker being generated while the motorized sample stage is in motion.

5. The microscope system according to claim 4, wherein the microscope system comprises at least one illumination element for illuminating the visual marker and/or the sample with light strobes, wherein the control system is configured to trigger the illumination element to emit light strobes at the plurality of points in time.

6. The microscope system according to claim 5, wherein the control system is configured to trigger the illumination element to emit the light strobes so that each pixel of an image being generated by the microscope and/or each pixel of a sample of the image data of the image showing the visual marker is exposed to a reflection of the same light strobe.

7. The microscope system according to claim 1, wherein the microscope system comprises two or more optical imaging sensors for providing image data of two or more images showing at least one of two or more visual markers of the sample stage, wherein the control system is configured to determine the position of the sample stage based on the image data of the two or more images showing the at least one of the two or more visual markers.

8. The microscope system according to claim 1, wherein the visual marker has a two-dimensional visual pattern.

9. The microscope system according to claim 1, wherein the sample stage comprises a first visual marker being aligned with a first lateral direction of movement and a second visual marker being aligned with a second lateral direction of movement of the sample stage, with each of the first and second marker having a one-dimensional visual pattern.

10. The microscope system according to claim 1, wherein the control system is configured to determine the position of the sample stage relative to the microscope.

11. The microscope system according to claim 1, wherein the control system is configured to annotate the images taken by the microscope with the position of the sample stage at the time the images are generated.

12. A control system for a microscope system, the microscope system comprising a microscope configured to generate an image of a sample being arranged on a sample stage, wherein the sample stage is configured to carry the sample, the sample stage comprising a visual marker arranged at a bottom side of the sample stage, wherein a lateral extent of the visual marker is at least as large as a maximal lateral movement of the sample stage, the control system comprising one or more processors and one or more storage devices, wherein the system is configured to:
obtain image data of an image showing the visual marker of the sample stage from an optical imaging sensor of the microscope system, wherein the optical imaging sensor is arranged below the sample stage; and
determine a position of the sample stage based on the image data of the image showing the visual marker.

13. A method for a microscope system, the microscope system comprising a microscope configured to generate an image of a sample being arranged on a sample stage, wherein the sample stage is configured to carry the sample, the sample stage comprising a visual marker arranged at a bottom side of the sample stage, wherein a lateral extent of the visual marker is at least as large as a maximal lateral movement of the sample stage, the method comprising:
obtaining image data of an image showing the visual marker of the sample stage from an optical imaging sensor that is arranged below the sample stage; and
determining a position of the sample stage based on the image data of the image showing the visual marker.

14. A non-transitory, computer-readable medium comprising a program code that, when the program code is executed on a processor, a computer, or a programmable hardware component, causes the processor, computer, or programmable hardware component to perform the method of claim 13.

* * * * *